United States Patent
Kim et al.

(10) Patent No.: US 9,998,731 B2
(45) Date of Patent: *Jun. 12, 2018

(54) 3-DIMENSIONAL DISPLAYING APPARATUS AND METHOD FOR DRIVING 3-DIMENSIONAL DISPLAYING APPARATUS

(71) Applicant: Samsung Electronics Co., Ltd., Suwon-si, Gyeonggi-do (KR)

(72) Inventors: Sung Kyu Kim, Seoul (KR); Ki Hyuk Yoon, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 140 days.

This patent is subject to a terminal disclaimer.

(21) Appl. No.: 14/938,496

(22) Filed: Nov. 11, 2015

(65) Prior Publication Data

US 2016/0094836 A1    Mar. 31, 2016

Related U.S. Application Data

(63) Continuation of application No. 13/093,699, filed on Apr. 25, 2011, now Pat. No. 9,188,788.

(30) Foreign Application Priority Data

Mar. 21, 2011    (KR) .................. 10-2011-0024939

(51) Int. Cl.
*G09G 5/00* (2006.01)
*G09G 3/36* (2006.01)
(Continued)

(52) U.S. Cl.
CPC ..... *H04N 13/0418* (2013.01); *G02B 27/2214* (2013.01); *G09G 3/003* (2013.01);
(Continued)

(58) Field of Classification Search
CPC .......... H04N 13/0418; H04N 13/0484; H04N 13/0497; G09G 3/342; G09G 3/003;
(Continued)

(56) References Cited

U.S. PATENT DOCUMENTS 5,349,379 A * 9/1994 Eichenlaub ........ G02B 27/0093
348/169
2003/0058209 A1    3/2003 Balogh
(Continued)

FOREIGN PATENT DOCUMENTS

JP    07218865    8/1995
JP    2003-533732 A    11/2003
(Continued)

OTHER PUBLICATIONS

Office Action for corresponding Korean Patent Application No. 10-2013-0005914 dated Jul. 7, 2016 and English language translation thereof.
(Continued)

*Primary Examiner* — Adam J Snyder
(74) *Attorney, Agent, or Firm* — Harness, Dickey & Pierce, P.L.C.

(57) ABSTRACT

A 3-dimensional displaying apparatus includes an image displaying panel having a plurality of pixels and a backlight panel spaced apart from one surface of the image displaying panel. The backlight panel includes a first line source set having a plurality of line sources arranged at regular intervals and a second line source set having line sources arranged spaced apart from the respective line sources of the first line source set by a predetermined interval. The first line source set and the second line source set are driven alternately. Thus, in a case where a horizontal location of an observer varies, the change of brightness of image information and the crosstalk between adjacent visual fields are
(Continued)

minimized, and pseudo-stereoscopic vision is prevented. Also, the irregularity of brightness distribution in a visual field may be solved.

20 Claims, 11 Drawing Sheets

(51) Int. Cl.
    *H04N 13/04*     (2006.01)
    *G02B 27/22*     (2018.01)
    *G09G 3/00*     (2006.01)
    *G09G 3/22*     (2006.01)
    *G09G 3/34*     (2006.01)

(52) U.S. Cl.
    CPC .............. *G09G 3/22* (2013.01); *G09G 3/3406* (2013.01); *G09G 3/36* (2013.01); *H04N 13/0484* (2013.01); *H04N 13/0497* (2013.01); *G09G 3/342* (2013.01); *G09G 2320/0209* (2013.01); *G09G 2320/0233* (2013.01)

(58) Field of Classification Search
    CPC .......... G09G 3/22; G09G 3/3406; G09G 3/36; G02B 27/2214
    USPC ...................................... 345/6, 102
    See application file for complete search history.

(56) References Cited

U.S. PATENT DOCUMENTS

| | | |
|---|---|---|
| 2005/0018288 A1 | 1/2005 | Redert |
| 2006/0187179 A1 | 8/2006 | Karman et al. |
| 2006/0279547 A1 | 12/2006 | Kerman et al. |
| 2007/0096125 A1* | 5/2007 | Vogel ................. G02B 27/2214 257/89 |
| 2008/0150936 A1 | 6/2008 | Karman |
| 2009/0009426 A1* | 1/2009 | Lee ..................... G02B 27/225 345/6 |
| 2010/0118218 A1* | 5/2010 | Eichenlaub .......... G09G 3/3426 349/15 |

FOREIGN PATENT DOCUMENTS

| | | |
|---|---|---|
| KR | 20060096430 A | 9/2006 |
| KR | 2009-0002948 A | 1/2009 |

OTHER PUBLICATIONS

Office Action for corresponding Korean Patent Application No. 10-2013-0005914 dated Dec. 5, 2016 and English language translation thereof.

* cited by examiner

3-DIMENSIONAL DISPLAYING APPARATUS AND METHOD FOR DRIVING 3-DIMENSIONAL DISPLAYING APPARATUS

CROSS-REFERENCE TO RELATED APPLICATION

This application is a Continuation Application of U.S. application Ser. No. 13/093,699, filed Apr. 25, 2011, which claims priority to Korean Patent Application No. 10-2011-0024939, filed on Mar. 21, 2011, and all the benefits accruing therefrom under 35 U.S.C. § 119, the contents of each of which in their entirety are herein incorporated by reference.

BACKGROUND

1. Field

The present disclosure relates to a 3-dimensional displaying apparatus, and more particularly to a 3-dimensional displaying apparatus and a driving method thereof, in which a set of line sources are driven alternately to minimize the change of brightness of image information and crosstalk between adjacent visual fields and to prevent pseudo-stereoscopic vision in a case where a horizontal location of an observer is changed.

2. Description of the Related Art

In recent, to meet the increasing demands on displaying apparatuses capable of realizing 3-dimensional images, which can give substantial stereoscopic views, not available in existing 2-dimensional images, various kinds of displaying apparatuses have been developed.

When seeing an article existing in the nature, a person feels cubic effect since visual angles of both eyes are slightly different from each other when the person looks at the article. Image information of the article with slightly different visual angles are formed on the retinas through right and left eyes, and the person feels cubic effect while the formed image information of both eyes is transferred to the brain through optic nerves.

In detail, a 3-dimensional image is generally realized by means of stereoscopic principles through both eyes. Thus, a displaying apparatus capable of displaying stereoscopic images by using the binocular disparity caused by the fact that both eyes are spaced apart from each other by about 65 mm is proposed. To explain the realization of 3-dimensional images in more detail, right and left eyes looking at the displaying apparatus respectively observe different 2-dimensional images. If both images are transferred to the brain through the respective retinas, the brain accurately fuses the images to generate an original 3-dimensional image with presence and immersion, which is generally called stereography.

A non-glasses 3-dimensional image displaying apparatus has a parallax separation unit in front of an existing 2-dimensional image displaying apparatus to transfer images of different visions to right and left eyes of an observer so that the observer may feel cubic effect. The parallax separation unit for giving cubic effect may be a parallax barrier plate or a lenticular lens sheet. FIG. 1 shows an example of realizing a 3-dimensional image by using the parallax barrier plate as a parallax separation unit.

FIG. 1 illustrates the principle of a 2-visual field 3-dimensional displaying apparatus as an example. Referring to FIG. 1, the 2-visual field 3-dimensional displaying apparatus 100 includes a general 2-dimensional image displaying panel 110 and a parallax barrier plate 130 disposed spaced apart at the front of the image displaying panel 110. Pixels formed at the image displaying panel 110 include left eye image pixels 13 and right eye image pixels 15. The parallax barrier plate 130 has an open portion and a barrier portion. Image information emitted from the left eye image pixels 13 and the right eye image pixels 15 passes the open portion but does not pass the barrier portion. The image information passing through the open portion is focused at a designed observing distance. Meanwhile, among locations of an observer at the designed observing distance, A location allows measuring only the image information of the left eye, and B location allows measuring only the image information of the right eye.

However, the method for displaying 3-dimensional images by means of parallax separation by the parallax barrier plate 130 has several problems to be solved. First, in a case where the eyes are horizontally moved so that the left eye is positioned at a D location and the right eye is positioned at an E location as an example, image information emitted from the left eye image pixel 13 and the right eye image pixel 15 are applied to the left and right eyes at the same time, as shown by dotted lines in FIG. 1. As a result, a clear 3-dimensional image cannot be observed. This phenomenon is called as crosstalk occurs between visual fields.

Second, in a case where the observer moves in a horizontal direction so that the left eye of the observer is positioned at a B location and the right eye is positioned at a C location, the left eye sees the image information emitted from the right eye image pixel 15 and the right eye sees the image information emitted from the left eye image pixel 13. As a result, pseudo-stereoscopic vision is generated so that the observer cannot see normal 3-dimensional stereoscopic information.

Third, the brightness of image is not uniform in the corresponding visual field, and the brightness of image varies as the eye moves in a horizontal direction. This problem will be described in detail with reference to FIG. 2.

FIG. 2 is an optic distribution graph of 3-dimensional image at each visual field by a general parallax separation unit. Here, the horizontal axis represents a horizontal location at an observing distance, and the vertical axis represents the intensity of light. Referring to FIG. 2, in a case where the left and right eyes are respectively positioned at a first visual field (depicted by a solid line) and a second visual field (depicted by a dotted line) and then move right or left in a horizontal direction as an example, it could be found that the brightness of the corresponding image is decreased and also crosstalk occurs since image information in an adjacent visual field is mixed.

The above description is based on the case where the parallax barrier plate is used as a parallax separation unit, but the same problem occurs even when a lenticular lens sheet is used.

SUMMARY

The present disclosure is directed to providing a non-glasses 3-dimensional displaying apparatus and its driving method, which may minimize the change of brightness of image information and the crosstalk between adjacent visual fields and prevent pseudo-stereoscopic vision.

In one aspect, there is provided a 3-dimensional displaying apparatus, which includes an image displaying panel having a plurality of pixels; and a backlight panel spaced apart from one surface of the image displaying panel, wherein the backlight panel includes a plurality of line sources arranged at regular intervals, and a width of each of the line sources is less than 30% (not including zero %) of a pitch of the pixel.

In this case, the width of each of the line sources may be 25% or less (not including zero %) of a pitch of the pixel.

In addition, the line sources may be self-lighting sources selected from light emitting diode (LED), organic light emitting diode (OLED), and field emission display (FED), or light-receiving sources capable of forming a line source by using another light source including surface source or laser and an optical element for converting another light source into a line source.

In another aspect, there is provided a 3-dimensional displaying apparatus, which includes an image displaying panel having a plurality of pixels; and a backlight panel spaced apart from one surface of the image displaying panel, wherein the backlight panel includes a first line source set having a plurality of line sources arranged at regular intervals and a second line source set having line sources arranged spaced apart from the respective line sources of the first line source set by a predetermined interval.

Here, a width of each line source of the first and second line source sets may be less than 30% (not including zero %) of a pitch of the pixel.

Also, the width of each line source of the first and second line source sets may be 25% or less (not including zero %) of a pitch of the pixel.

In addition, the interval among the line sources of the first line source set may be identical to the interval among the line sources of the second line source set.

In this case, a shortest distance between the first line source set and the second line source set may be ¼ of the interval among the line sources of the first and second line source sets.

In still another aspect, there is provided a 3-dimensional displaying apparatus, which includes an image displaying panel having a plurality of pixels; a backlight panel spaced apart from one surface of the image displaying panel; and a pupil tracking unit for tracking location of the pupil of an observer to feed the location back to the backlight panel, wherein the backlight panel includes a first line source set having a plurality of line sources arranged at regular intervals and a second line source set having line sources arranged spaced apart from the respective line sources of the first line source set by a predetermined interval, and the first line source set and the second line source set are driven alternately in accordance with the fed-back location of the pupil.

The backlight panel may further include third to nth line source sets (n is an integer of 4 or above), and the first to nth line source sets are arranged at regular interval to be subsequently adjacent to each other, and a part of the first to nth line source sets may be selectively driven in accordance with the fed-back location of the pupil.

Also, the first and second line source sets may be arranged to be inclined against the arrangement of pixels.

In addition, the 3-dimensional displaying apparatus may further include a dispersion panel formed between the backlight panel and the image displaying panel to disperse or transmit a light emitted from the line sources in accordance with voltage applied thereto.

Here, the dispersion panel may be polymer dispersed liquid crystal (PDLC).

In further another aspect, there is provided a method for driving a 3-dimensional displaying apparatus, which includes: forming a plurality of visual fields at a location spaced apart from an image displaying panel by a predetermined distance as a light emitted from a first or second line source set formed at a backlight panel passes through the image displaying panel; tracking location of the pupil of an observer to feed the tracked location of the pupil back to the backlight panel; and alternately driving the first and second line source sets so that a center portion of the visual field is positioned at the fed-back location of the pupil.

Here, a width of each line source of the first and second line source sets may be less than 30% (not including zero %) of a pitch of the pixel.

Also, the width of each line source of the first and second line source sets may be 25% or less (not including zero %) of a pitch of the pixel.

In particular, the method for driving a 3-dimensional displaying apparatus may further include dispersing or transmitting a light emitted from the line sources in accordance with voltage applied to a dispersion panel between the backlight panel and the image displaying panel.

BRIEF DESCRIPTION OF THE DRAWINGS

The above and other aspects, features and advantages of the disclosed exemplary embodiments will be more apparent from the following detailed description taken in conjunction with the accompanying drawings in which.

REFERENCE SYMBOLS

Figure 1:
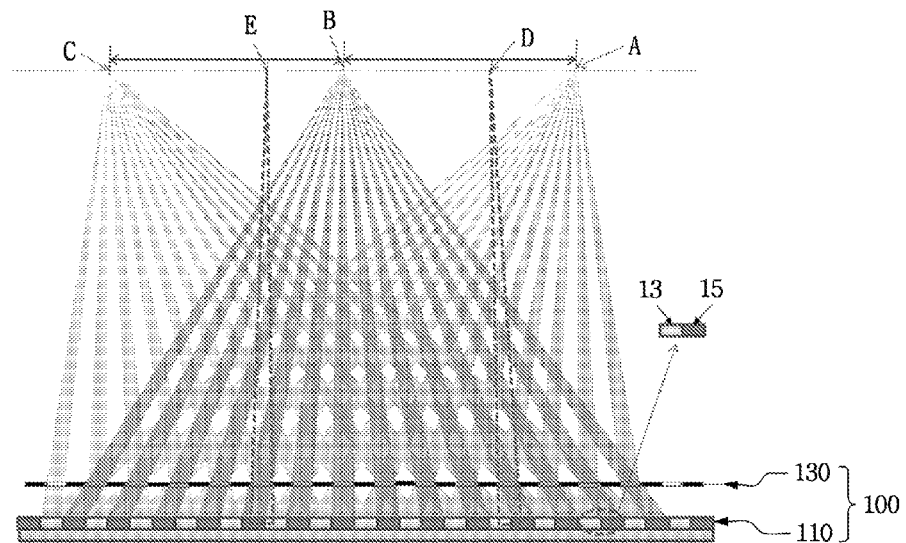
FIG. 1 is a sectional view illustrating a principle of a general 3-dimensional displaying apparatus using a parallax barrier plate.

| | |
|---|---|
| 10: Pixel | 13: Left eye image pixel |
| 15: Right eye image pixel | 20: Black matrix (BM) |
| 30: First line source set | 50: Second line source set |
| 100, 200, 300: 3-Dimensional displaying apparatus | |
| 150: Observing location | 210: Image displaying panel |
| 211: Backlight panel | 270: Pupil tracking unit |

DETAILED DESCRIPTION

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

First Embodiment

Figure 3:
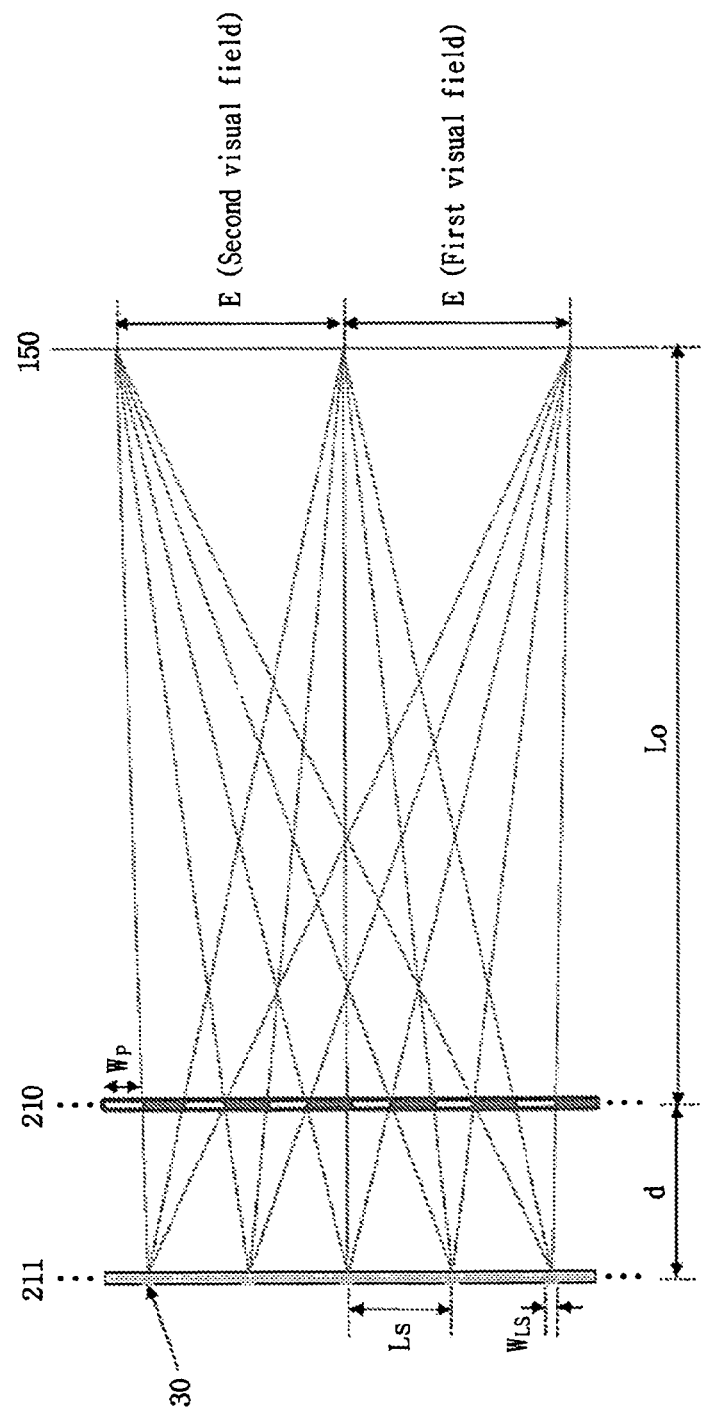
FIG. 3 is a plane view showing an autostereoscopic display using a line source according to an embodiment disclosed herein.

FIG. 3 shows an autostereoscopic display using a line source according to an embodiment disclosed herein. Referring to FIG. 3, the display of this embodiment includes an image displaying panel 210 and a backlight panel 211 having a plurality of line sources (hereinafter, referred to as a first line source set) arranged spaced apart from the rear surface of the image displaying panel 210 by a predetermined distance. The plurality of line sources of the first line source set 30 of the backlight panel 211 are arranged at regular intervals so that image information formed on the image displaying panel 210 has different visual fields at a designed observing location 150. FIG. 3 shows a concept in which a left visual field (a first visual field) and a right visual field (a second visual field) are separated at the designed observing location for two-visual field image information, as an example.

The size E of each visual field is based on 65 mm, which is an average distance between eyes of a common person, but the size E may be set to be smaller than the average distance between eyes when two or more visual fields are classified. For example, in order to properly watch a two-visual field image at the observing location 150, a relation among a designed observing distance Lo from the image displaying panel 210, a size E of each visual field, a distance d between the backlight panel 211 including the first line source set 30 and the image displaying panel 210, a pitch Wp of a pixel of the image displaying panel 210, and a distance Ls between adjacent line sources is idealistically expressed with the following two equations.

$$L_s = 2W_p \frac{L_o + d}{L_o} \quad \text{[Equation 1]}$$

$$d = \frac{W_p L_o}{E - W_p} \quad \text{[Equation 2]}$$

In the equations 1 and 2, the material used for coating the first line source set 30 of the backlight panel 211 or the upper and lower substrates of the image displaying panel 210 is not considered. Thus, a corrected relational expression should be used for a design forming a substantial visual field.

Figure 2:
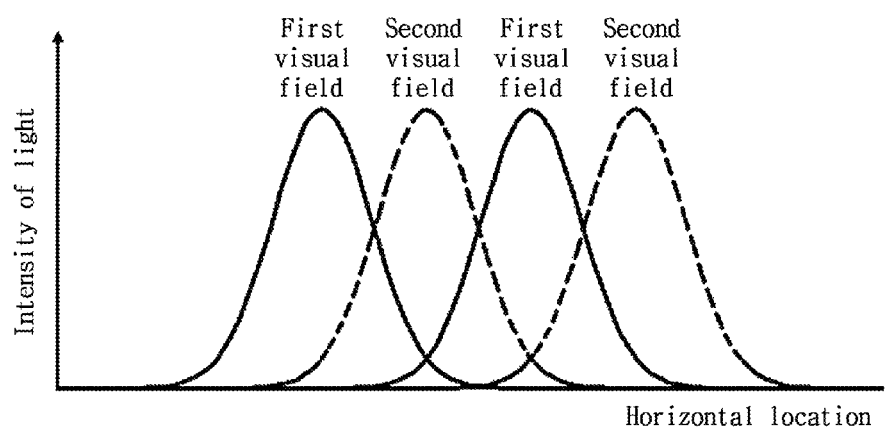
FIG. 2 is an optic distribution graph of 3-dimensional image at each visual field by using a general parallax separation unit.

Though being formed by a design using the above relational expression, a visual field at the observing location 150 still has problems in crosstalk between adjacent visual fields and brightness uniformity within the visual field as in the visual field formed by a general disparity separation unit (see FIG. 2).

In the present disclosure, a line width WLS of the line source is decreased smaller than a predetermined ratio in comparison to the pixel pitch Wp of the image displaying panel 210 in order to solve the problems.

Figure 4:
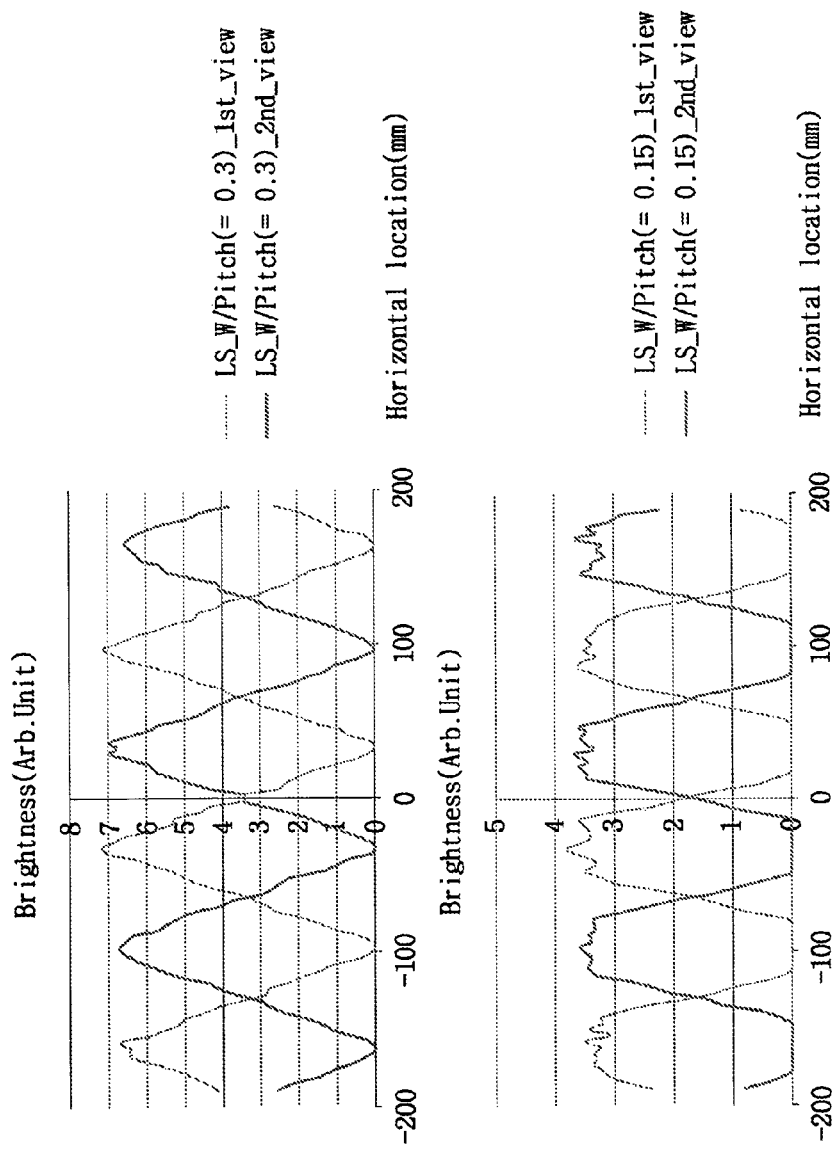
FIG. 4 is a graph showing a shape of visual field according to a line width of the line source according to an embodiment disclosed herein.
Figure 5:
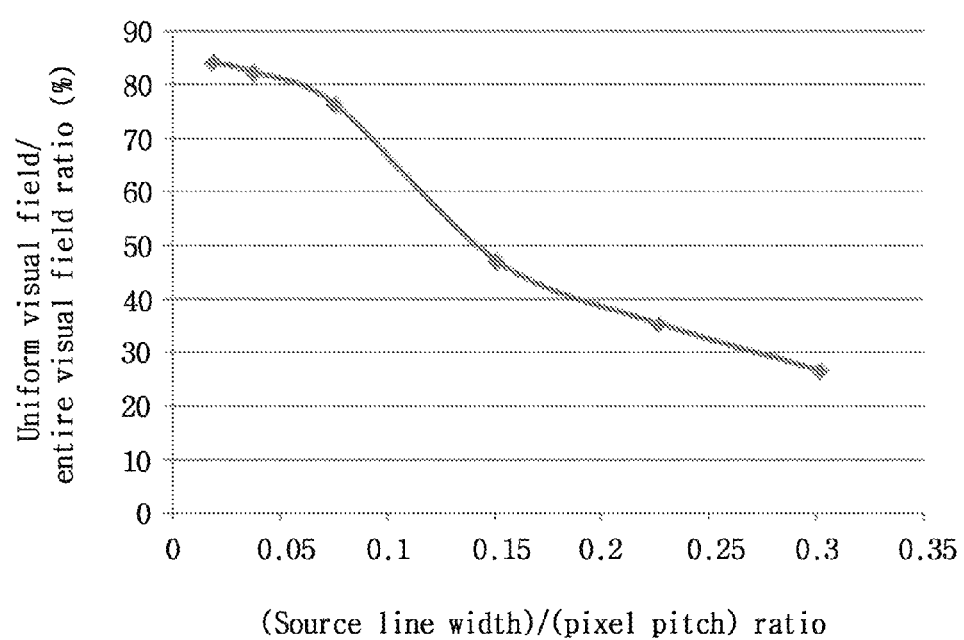
FIG. 5 is a graph showing a relation between a line width of a line source compared with a pixel pitch and a visual field with uniform brightness over the entire visual field according to an embodiment disclosed herein.

The variation of visual field according to the line width WLS of the line source is shown in FIGS. 4 and 5. FIGS. 4 and 5 show simulation results using a common silumator, Lighttools (produced by ORA), for the case having conditions of d=2 mm, Lo=1000 mm, E=65 mm, Wp=0.265 mm for an observing distance from the image displaying panel or the like. The graph at an upper part of FIG. 4 shows the case where a line width WLS of the line source is 30% of the pixel pitch Wp of the image displaying panel 210. In this case, the visual field has a similar shape to a visual field formed using a common disparity barrier. The graph at a lower part of FIG. 4 shows the case where a line width WLS of the line source is 15% of the pixel pitch Wp of the image displaying panel 210. In this case, it could be found that uniform visual field occupies about 50% in the entire visual field.

FIG. 5 is a graph showing a relation between a line width of a line source compared with a pixel pitch and a visual field with uniform brightness in the entire visual field. In this graph, the horizontal axis represents a value obtained by dividing the line width WLS of the line source by the pixel pitch Wp, and the vertical axis represents a ratio (%) of the uniform visual field in the entire visual field. Seeing the simulation results, it could be found that, as the line width WLS of the line source compared with the pixel pitch Wp is smaller, the uniform visual field becomes wider to form an ideal uniform visual field. However, in consideration of optic efficiency and technical problems such as formation of line source, the line width WLS of the line source may be 25% or less of the pixel pitch Wp (WLS/Wp≤0.25).

Figure 6:
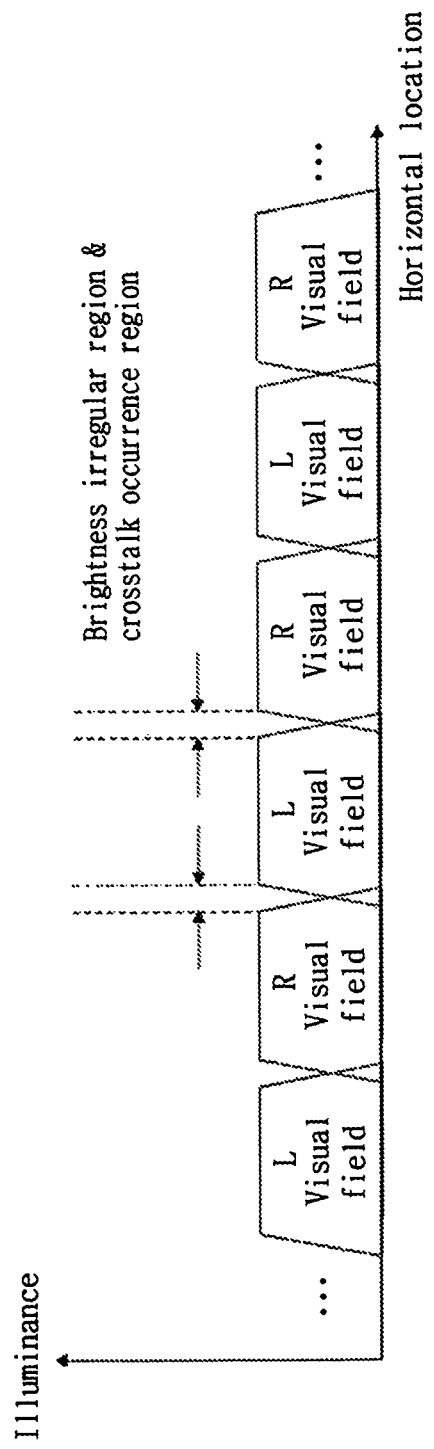
FIG. 6 is a schematic view showing a relation between the change of visual field and a 3-dimensional image when an observing location moves in a horizontal direction according to an embodiment disclosed herein.

FIG. 6 shows visual field distribution of an image in a case where a line width of a line source is set to be smaller than a predetermined range of a pixel pitch, in the structure shown in FIG. 3. In this case, if an observer moves from the designed observing distance Lo in a horizontal direction, L visual field information corresponding to the left eye and R visual field information corresponding to the right eye are successively arranged. As a result, seeing the locations of the eyes of the observer, the left eye may see a uniform 3-dimensional image in the L visual field and the right eye may see a uniform 3-dimensional image in the R visual field. However, if the observer moves beyond the range of the corresponding visual field, for example in a case where the left eye of the observer is positioned in the R visual field where the right image is watched and the right eye is positioned in the L visual field where the left image is watched, a pseudo-stereoscopic vision is watched.

In addition, in a case where the left and right eyes of the observer are positioned out of a uniform region in the visual field, the brightness of an image is deteriorated, and crosstalk occurs since an image of an adjacent visual field comes in.

The image displaying panel used in the present disclosure may be a flat display such as liquid crystal panel (LCP) that expresses an image by controlling transmittance of a backlight. Also, the line source used in the present disclosure may be any light source capable of forming line source such as self-lighting sources, for example light emitting diode (LED), organic light emitting diode (OLED), and field emission display (FED). In addition, the line source may be a light-receiving source that may form a line source by using an optical element (lenticular lens or the like) capable of converting a light source such as surface source or laser into a line source.

Second Embodiment

Though the apparatus of the first embodiment allows observing a 3-dimensional image with uniform brightness within a predetermined range when the eyes move in a horizontal direction within the corresponding visual field, it is impossible to entirely eliminate the problem of pseudo-stereoscopic vision and crosstalk when moving between visual fields. The second embodiment disclosed herein is directed to solving the problems of the first embodiment. Also, the techniques about the width of line source described in the first embodiment may be applied to the structure of the second embodiment as it is to control the uniformity of brightness.

Figure 7:
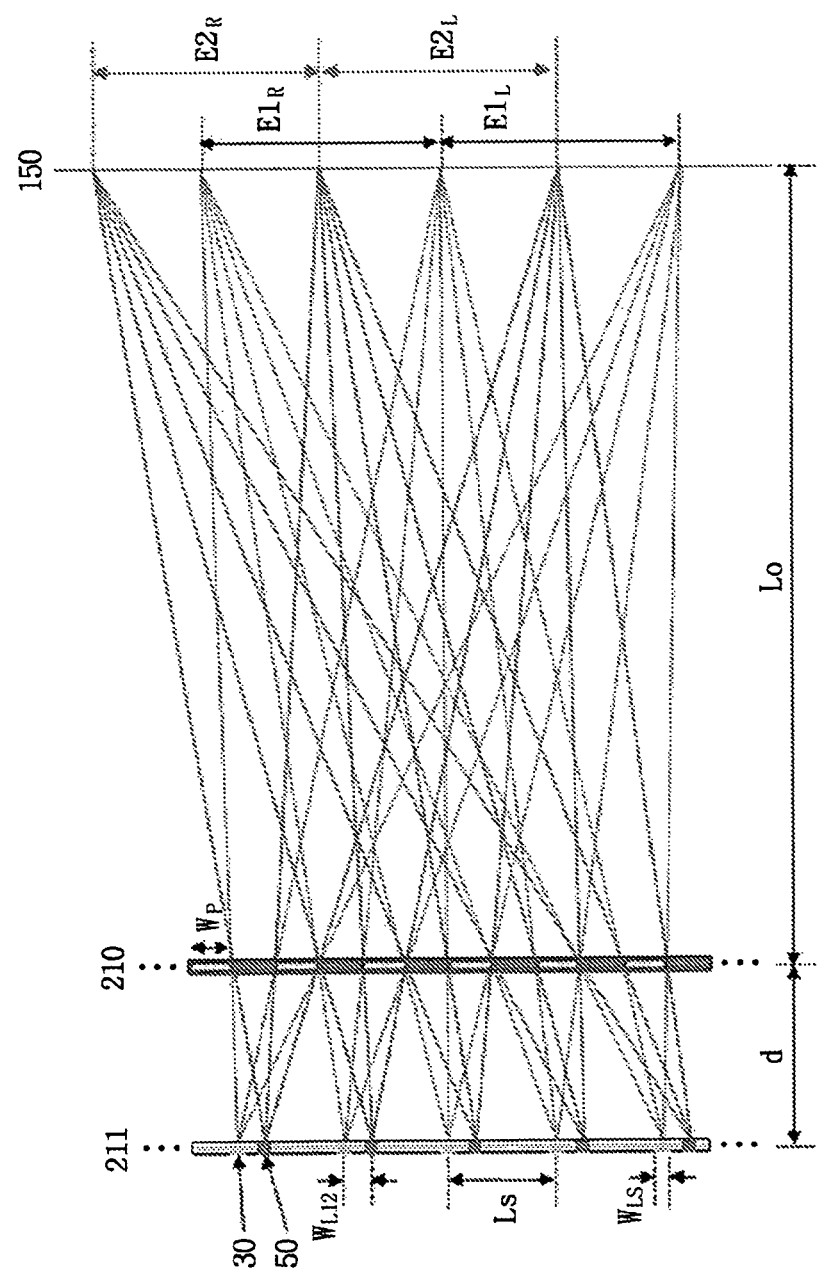
FIG. 7 is a plane view showing a 3-dimensional displaying apparatus using a plurality of line sources according to another embodiment disclosed herein.

FIG. 7 is a schematic view showing a 3-dimensional displaying apparatus using a plurality of line sources disclosed herein. Referring to FIG. 7, a backlight 211 having line sources arranged spaced apart from each other at regular intervals is disposed at the rear side of an image displaying panel 210, as in the first embodiment disclosed herein. However, the second embodiment disclosed herein further includes a second line source set 50 having other line sources in addition to the first line source set 30 of the first embodiment. An interval Ls among the line sources of the second line source set 50 may be the same as the interval among line sources of the first line source set 30. Also, a line source of the first line source set 30 is spaced apart from an adjacent line source of the second line source set 50 by a predetermined distance WL12. In a two-visual field 3-dimensional displaying apparatus, the distance WL12 may be ¼ of the interval Ls between line sources in each line source set.

Though two line source sets are illustrated in FIG. 3, 3 or more line source sets, namely a n number of line source sets (n is an integer of 3 or above) may be realized at the backlight panel 211. In this case, the 3-dimensional displaying apparatus may be realized by reducing a distance among line sources of each line source set in reverse proportion to the number n. In this embodiment, the basic concept is described based on a 2-visual field 3-dimensional displaying apparatus that is the simplest one. FIG. 7 is a conceptual view showing a 3-dimensional displaying apparatus having two visual fields, in which a distance WL12 between the first line source set 30 and the second line source set 50 is ¼ of the interval Ls between line sources. In this case, if the first line source set 30 turns on and the second line source set 50 turns off, visual fields of E1R and E1L are formed at the observing location 150. Meanwhile, in a case where the first line source set 30 turns off and the second line source set 50 turns on, visual fields of E2R and E2L are formed at the observing location 150. In particular, the apparatus of this embodiment further includes a pupil tracking unit for feeding back the locations of the eyes of an observer. As a result, the first line source set 30 or the second line source set 50 is selectively driven in accordance with the location of the eyes of the observer so that a 3-dimensional image may be observed without pseudo-stereoscopic vision or crosstalk. It will be described later in more detail with reference to FIGS. 8 and 9.

Figure 8:
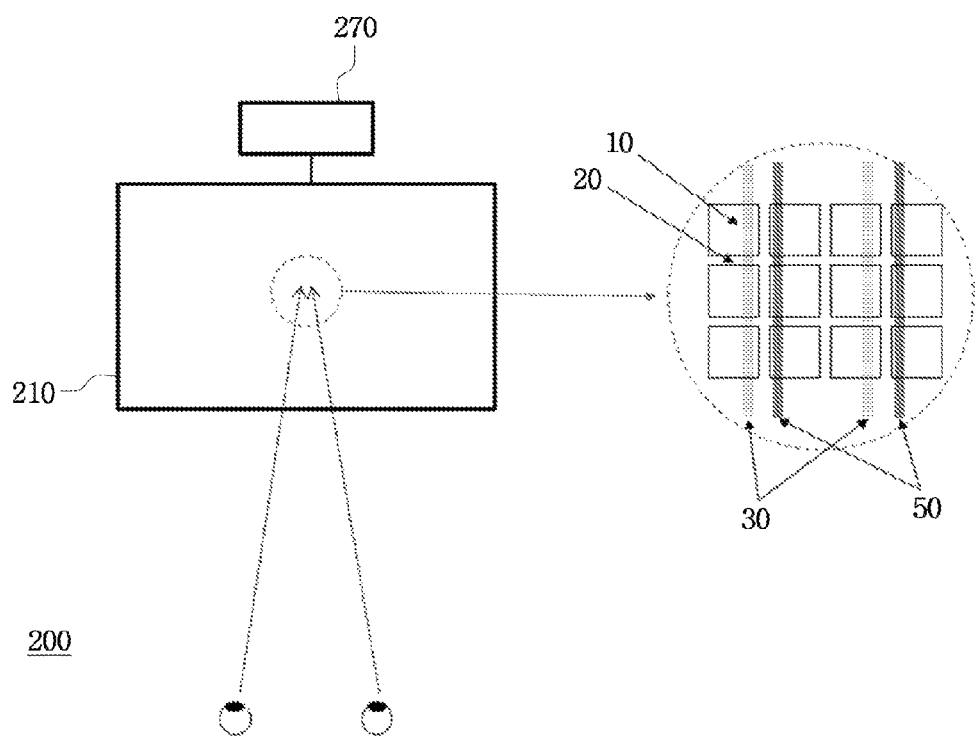
FIG. 8 is a front view showing the 3-dimensional displaying apparatus having a pupil tracking unit according to another embodiment disclosed herein.

FIG. 8 is a front view showing the 3-dimensional displaying apparatus according to the second embodiment disclosed herein, which further includes the pupil tracking unit. Referring to FIG. 8, the 3-dimensional displaying apparatus 200 including the backlight panel 211 with the first line source set 30 and the second line source set 50 and the image displaying panel 210 further includes a pupil tracking unit 270 for tracking the location of the eyes of an observer. As shown in the right side of FIG. 8, if the front side of the image displaying panel is enlarged, the first line source set 30 and the second line source set 50 are positioned at the rear side of the pixel 10, and a black matrix 20 is formed between pixels 10. The pupil tracking unit 270 may be provided to the image displaying panel 210 or may be separately installed. However, the pupil tracking unit 270 should be directly or indirectly connected to the backlight panel 211 in order to drive the backlight panel 211 based on the tracked location of the pupil.

Figure 9:
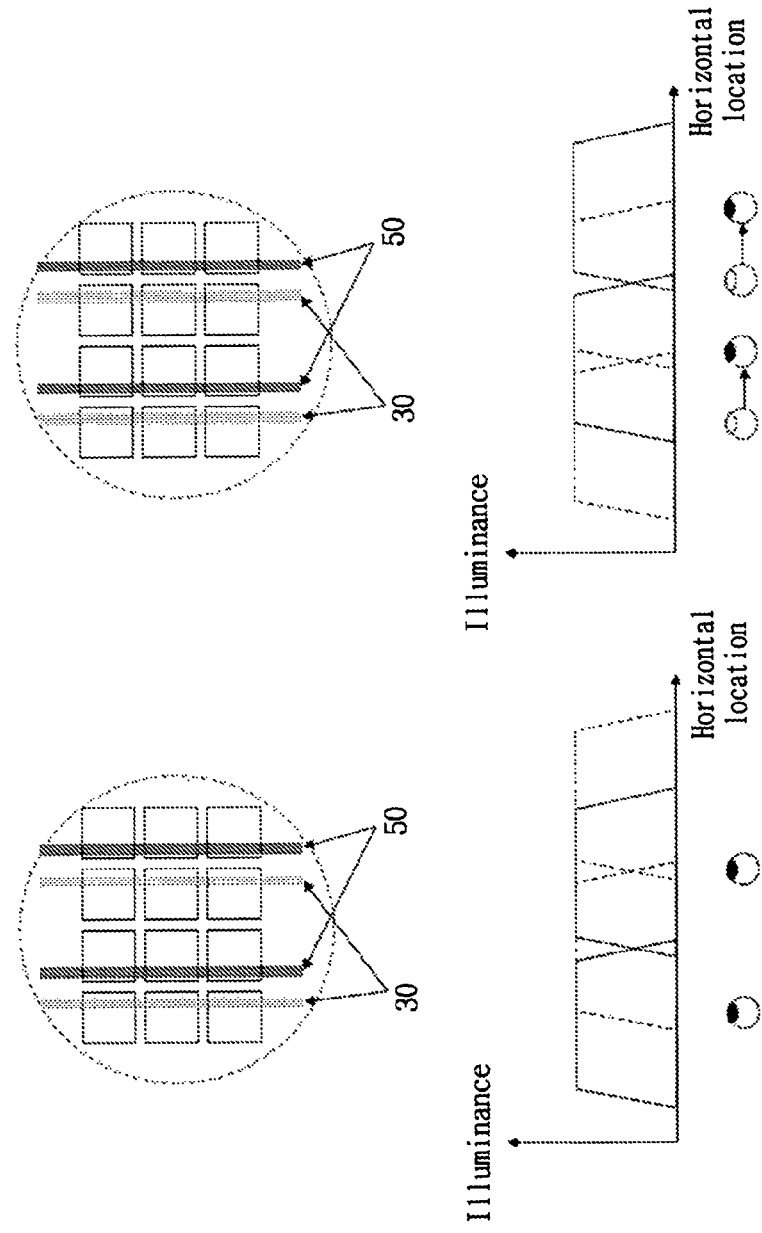
FIG. 9 is a schematic view showing basic principles for driving the 3-dimensional displaying apparatus according to another embodiment disclosed herein.

FIG. 9 is a schematic view showing basic principles for driving the 3-dimensional displaying apparatus according to the second embodiment disclosed herein. In a case where an observer at an observing location has a left eye at E1L and a right eye at E1R, the backlight panel 211 is driven in a state in which the first line source set 30 turns on and the second line source set 50 turns off. As a result, the observer may observe a clear 3-dimensional image. Meanwhile, in a case where the observer moves to the right from the observing location in a horizontal direction, the pupil tracking unit tracks the location of the eyes of the observer in real time to feed the tracked location back to the backlight 211. Based on the fed-back results, before the observer reaches a region with irregular brightness or a border of a visual field formed by the first line source set 30, the backlight panel turns off the first line source set 30 and turns on the second line source set 50. As a result, the observer may see a 3-dimensional image without pseudo-stereoscopic vision, crosstalk between adjacent visual fields, and irregular image brightness, even when moving beyond the range of the corresponding visual field.

In this embodiment, the operation principle is described based on a two-visual field 3-dimensional image that is the simplest one, but the same concept may be applied to multi-visual field 3-dimensional images with more than two visual fields.

Third Embodiment

Figure 10:
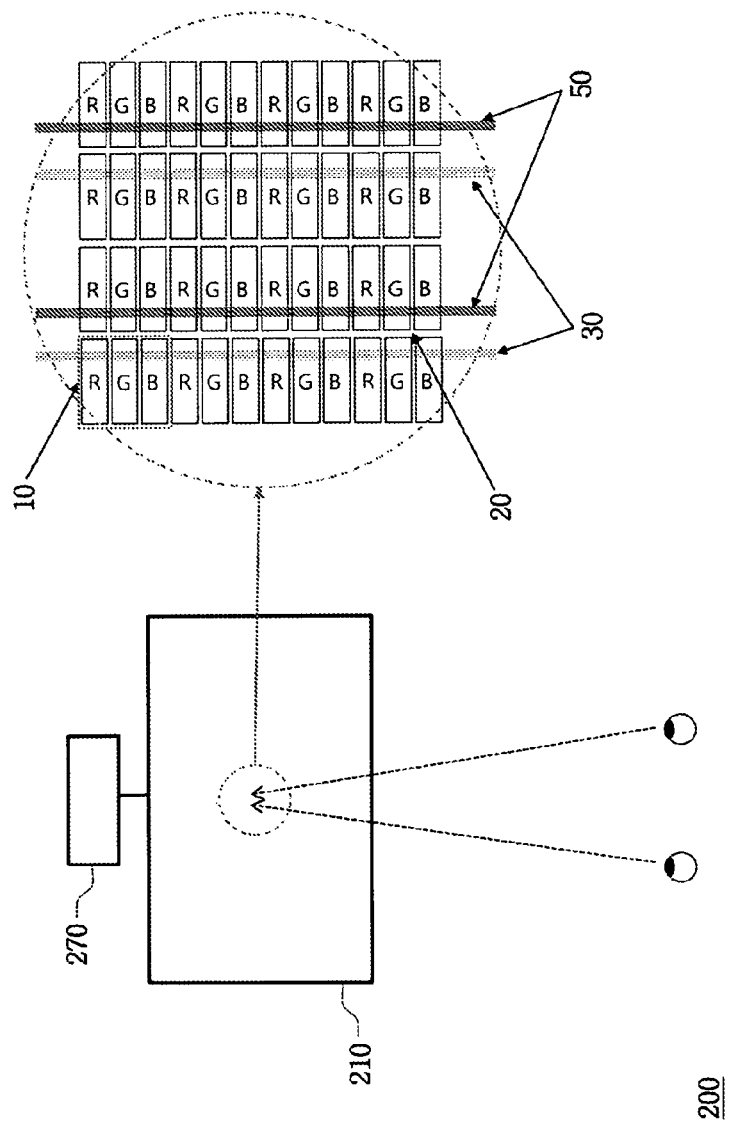
FIGS. 10 and 11 are enlarged front views showing a 3-dimensional displaying apparatus according to still another embodiment disclosed herein.
Figure 11:
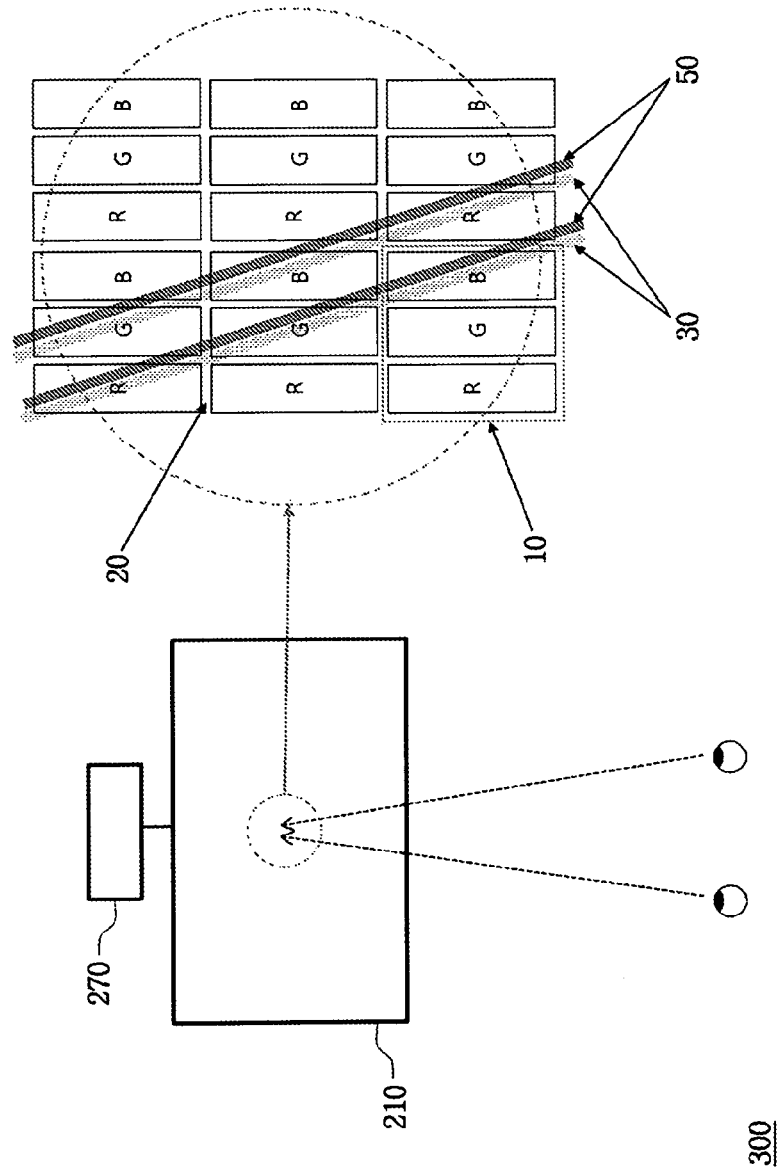

FIGS. 10 and 11 are enlarged front views showing a 3-dimensional displaying apparatus according to a third embodiment disclosed herein. The pixels shown in FIGS. 8 and 9 are generally composed of red (R), green (G) and blue (B) sub pixels to realize a color image displaying apparatus. As shown in the right side of FIG. 10, the vertical line source set shown in FIGS. 8 and 9 is arranged so that all of the sub pixels R, G and B in the pixel 10 and the first and second line source sets 30 and 50 are arranged in a vertical direction. Thus, in a case where one of the first and second line source sets 30 and 50 is operated, the light emitted from the operating line source set passes through all of the sub pixels R, G and B at each pixel. As a result, no problem occurs in realizing colors while visual fields are separated.

However, as shown in the right part of FIG. 11, in a case where the sub pixels R, G and B are arranged in a horizontal direction, a color 3-dimensional image may not be properly realized. It is because the lights emitted from the vertically arranged line sources pass through the R, G and B sub pixels at horizontally different locations in one pixel to give color-separating effects in accordance with a horizontal location in each visual field formed at an optimal observing location from the display. For example, along with the movement of the horizontal location, a part of sub pixels R, G and B may be observed in each visual field. Thus, an exact color image may not be observed.

To solve this problem, the first line source and the second line source are arranged to be inclined from the pixel arrangement. The degree of inclination is determined so that the first line source and the second line source are equivalently matched with the sub pixels R, G and B. In this case, the location of the pupil of the observer is fed back to the backlight panel by means of the pupil tracking unit 270 as described above, and one of the first line source set 30 and the second line source set 50 is operated in accordance with the location of the eyes of the observer. In a case where three or more line source sets are included, a part of all line source sets is operated. As a result, the observer may observe a 3-dimensional image with exact color, without experiencing pseudo-stereoscopic vision or crosstalk even during horizontal movement.

Fourth Embodiment

Figure 12:
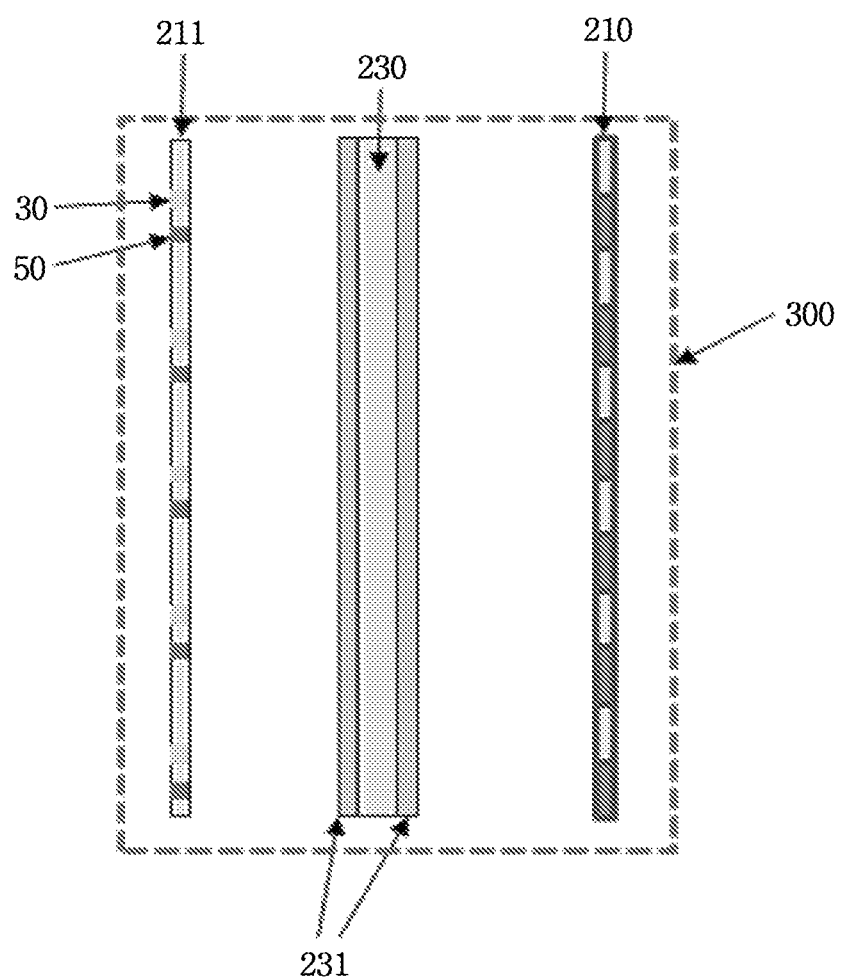
FIG. 12 shows a configuration of a 3-dimensional displaying apparatus according to further another embodiment disclosed herein.

FIG. 12 shows a structure of a 3-dimensional displaying apparatus according to a fourth embodiment disclosed herein. Referring to FIG. 12, the apparatus of the fourth embodiment disclosed herein further includes a dispersion panel in addition to the 3-dimensional displaying apparatus of the first to third embodiment. In detail, the dispersion panel 230 is formed between the backlight panel 211 and the image displaying panel 210. Also, transparent electrodes 231 are formed on both surfaces of the dispersion panel 230 so that the dispersion panel 230 turns on or off by an electric current applied to the transparent electrode 231. In a case where current is applied to the transparent electrode 231, the light of line source emitted from the backlight panel 211 is dispersed to give a common 2-dimensional image. Also, in a case where current is not applied to the transparent electrode 231, a 3-dimensional image may be observed by means of visual field separation according to the arrangement of each line source set 30 and 50 of the backlight panel 211. In an opponent case, it is also possible to realize a 3-dimensional image when voltage is applied and to realize a 2-dimensional image when voltage is not applied. It depends on initial arrangement of cells in the dispersion panel.

The dispersion panel 230 electrically controlled as mentioned above may be a polymer dispersed liquid crystal (PDLC). PDLC may play a role of the dispersion panel according to the initial arrangement state of PDLC based on the electricity applied to both transparent electrodes. Meanwhile, an optical device capable of controlling the dispersion in an electric way may be used as an embodiment in addition to PDLC.

According to the present disclosure, in a case where a horizontal location of an observer is changed, it is possible to minimize the change of brightness of image information and the crosstalk between adjacent visual fields and prevent pseudo-stereoscopic vision. Also, the irregularity of brightness distribution in a visual field may be solved.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A 3-dimensional (3D) displaying apparatus, comprising:
   an image displaying panel having a plurality of pixels; and
   a backlight panel spaced apart from one surface of the image displaying panel,
   wherein the backlight panel includes a plurality of light emitting units,
   wherein a width of each of the light emitting units is more than 0% and less than 25% of a pitch of all of the plurality of pixels.

2. The 3-dimensional displaying apparatus according to claim 1, wherein the plurality of light emitting units are arranged to operate at the same time, and each of the light emitting units creates a 3D visual field including a left visual field and a right visual field.

3. The 3-dimensional displaying apparatus according to claim 1, wherein the plurality of light emitting units are spaced apart such that each of the light emitting units provides light to more than one of the plurality of pixels in a same row of the image displaying panel.

4. The 3-dimensional displaying apparatus according to claim 1, wherein the light emitting units are self-lighting sources selected from light emitting diode (LED), organic light emitting diode (OLED), and field emission display (FED), or light-receiving sources having another light source including surface light source and an optical element for converting another light source into a line light source.

5. A 3-dimensional (3D) displaying apparatus, comprising:
an image displaying panel having a plurality of pixels; and
a backlight panel spaced apart from one surface of the image displaying panel, wherein the backlight panel comprises:
a first light emitting unit set having a plurality of light emitting units arranged at regular intervals; and
a second light emitting unit set having light emitting units arranged spaced apart from the respective light emitting units of the first light emitting unit set by a predetermined interval;
wherein a width of each light emitting unit of the first and second light emitting unit sets is more than 0% and less than 25% of a pitch of all of the plurality of pixels.

6. The 3-dimensional displaying apparatus according to claim 5, wherein the first light emitting unit set provides a first 3D visual field including a first left visual field and a first right visual field; and
wherein the second light emitting unit set provides a second 3D visual field including a second left visual field and a second right visual field.

7. The 3-dimensional displaying apparatus according to claim 6, wherein the first 3D visual field and the second 3D visual field are positioned at different locations horizontally and at least a portion of the first 3D visual field overlaps at least a portion of the second 3D visual field; and
wherein the first light emitting unit set and the second light emitting unit set are driven at different times.

8. The 3-dimensional displaying apparatus according to claim 5, wherein the plurality of light emitting units are spaced apart such that each of the light emitting units provides light to more than one of the plurality of pixels in a same row of the image displaying panel.

9. The 3-dimensional displaying apparatus according to claim 5, wherein the interval among the light emitting units of the first light emitting unit set is identical to the interval among the light emitting units of the second light emitting unit set.

10. The 3-dimensional displaying apparatus according to claim 9, wherein a shortest distance between the light emitting unit of the first light emitting unit set and the light emitting unit of the second light emitting unit set is ¼ of the interval among the light emitting units of the first and second light emitting unit sets.

11. A 3-dimensional (3D) displaying apparatus, comprising:
an image displaying panel having a plurality of pixels;
a backlight panel spaced apart from one surface of the image displaying panel; and
an eye tracking unit for tracking locations of the eyes of an observer to feed the locations back to the backlight panel,
wherein the backlight panel comprises:
a first light emitting unit set having a plurality of light emitting units arranged at regular intervals; and
a second light emitting unit set having light emitting units arranged spaced apart from the respective light emitting units of the first light emitting unit set by a predetermined interval,
wherein the first light emitting unit set is driven when the eye tracking unit tracks first locations of the eyes of the observer, the first locations of the eyes in a position associated with a first 3D visual field, and the second light emitting unit set is driven and the first light emitting unit set is turned off when the eye tracking unit tracks movement of the eyes of the observer to second locations, the second locations of the eyes in a position associated with a second 3D visual field,
wherein a width of each light emitting unit of the first and second light emitting unit sets is more than 0% and less than 25% of a pitch of all of the plurality of pixels.

12. The 3-dimensional displaying apparatus according to claim 11, wherein the first light emitting unit set provides the first 3D visual field including a first left visual field and a first right visual field; and
the second light emitting unit set provides the second 3D visual field including a second left visual field and a second right visual field.

13. The 3-dimensional displaying apparatus according to claim 12, wherein the first 3D visual field and the second 3D visual field are positioned at different locations horizontally and at least a portion of the first 3D visual field overlaps with a portion of the second 3D visual field.

14. The 3-dimensional displaying apparatus according to claim 11, wherein the plurality of light emitting units are spaced apart such that each of the light emitting units provides light to more than one of the plurality of pixels in a same row of the image displaying panel.

15. The 3-dimensional displaying apparatus according to claim 11, wherein the backlight panel further includes third to n-th light emitting unit sets, and the first to n-th light emitting sets are arranged at regular interval to be subsequently adjacent to each other, and
a part of the first to n-th light emitting unit sets are selectively driven in accordance with the fed-back locations of the eyes,
wherein n is an integer of 4 or more.

16. The 3-dimensional displaying apparatus according to claim 11, wherein the first light emitting unit set and second light emitting unit sets are arranged to be inclined against the arrangement of pixels.

17. The 3-dimensional displaying apparatus according to claim 11, further comprising a dispersion panel formed between the backlight panel and the image displaying panel to disperse or transmit a light emitted from the first light emitting unit set or the second light emitting unit set in accordance with voltage applied thereto.

18. The 3-dimensional displaying apparatus according to claim 17, wherein the dispersion panel is polymer dispersed liquid crystal (PDLC).

19. A method for driving a 3-dimensional (3D) displaying apparatus including an image display panel and a backlight panel comprising a first light emitting unit set associated with a first 3D visual field and a second light emitting unit set associated with a second 3D visual field, the method comprising:
tracking first locations of eyes of an observer, the first locations of the eyes in a position associated with the first 3D visual field;
driving the first light emitting unit set associated with the first 3D visual field to emit first light that passes through the image display panel to form the first 3D visual field including a first left visual field and a first right visual field at a distance away from the image display panel responsive to the tracking the first locations of the eyes in the position associated with the first 3D visual field, the first 3D visual field formed such that the location of each of the eyes is positioned at a periphery of a center of one of the first left visual field or the first right visual field;

tracking movement of the eyes of the observer to second locations, the second locations of the eyes in a position associated with the second 3D visual field; and turning off the first light emitting unit set and driving the second light emitting unit set associated with the second 3D visual to emit second light that passes through the image display panel to form the second 3D visual field including a second left visual field and a second right visual field at the distance away from the image display panel responsive to the tracking movement of the eyes of the observer to the second locations, the second 3D visual fields formed such that the second location of each of the eyes is positioned at a periphery of a center of one of the second left visual field or the second right visual field, wherein a width of each light emitting unit of the first and second light emitting unit sets is more than 0% and less than 25% of a pitch of all of the plurality of pixels.

20. The method for driving a 3-dimensional displaying apparatus according to claim 19, further comprising:

dispersing or transmitting the first light or the second light in accordance with voltage applied to a dispersion panel between the backlight panel and the image displaying panel.

* * * * *